US008139475B2

(12) United States Patent
Vercellone et al.

(10) Patent No.: US 8,139,475 B2
(45) Date of Patent: Mar. 20, 2012

(54) METHOD AND SYSTEM FOR FAULT AND PERFORMANCE RECOVERY IN COMMUNICATION NETWORKS, RELATED NETWORK AND COMPUTER PROGRAM PRODUCT THEREFOR

(75) Inventors: Vinicio Vercellone, Turin (IT); Alessandro Faure Ragani, Turin (IT); Massimo Sassi, Turin (IT); Marzio Alessi, Turin (IT); Luca Fantolino, Turin (IT)

(73) Assignee: Telecom Italia S.p.A., Milan (IT)

( * ) Notice: Subject to any disclaimer, the term of this patent is extended or adjusted under 35 U.S.C. 154(b) by 1452 days.

(21) Appl. No.: 11/658,704

(22) PCT Filed: Jul. 29, 2004

(86) PCT No.: PCT/EP2004/008523
§ 371 (c)(1),
(2), (4) Date: Jan. 29, 2007

(87) PCT Pub. No.: WO2006/010381
PCT Pub. Date: Feb. 2, 2006

(65) Prior Publication Data
US 2008/0316914 A1  Dec. 25, 2008

(51) Int. Cl.
*G01R 31/08* (2006.01)
*H04L 12/28* (2006.01)
(52) U.S. Cl. ............... 370/216; 370/242; 370/254
(58) Field of Classification Search .............. None
See application file for complete search history.

(56) References Cited

U.S. PATENT DOCUMENTS

| 7,664,043 | B1* | 2/2010 | D'Souza et al. ............... 370/242 |
| 2002/0075813 | A1* | 6/2002 | Baldonado et al. ........... 370/254 |
| 2002/0078223 | A1 | 6/2002 | Baldonado et al. |
| 2002/0087680 | A1 | 7/2002 | Cerami et al. |
| 2003/0112755 | A1* | 6/2003 | McDysan ...................... 370/230 |

FOREIGN PATENT DOCUMENTS

| WO | WO 02/080462 | 10/2002 |
| WO | WO 03/001330 | 1/2003 |
| WO | WO 03/041342 | 5/2003 |

OTHER PUBLICATIONS

Nadeau et al., "OAM Requirements for MPLS Networks", XP-002316305, Network Working Group, Internet Draft, pp. 1-13, (2004).
Mohan et al., "VPLS OAM Requirements and Framework", XP-002316306, Internet Draft Document, Layer-2 VPN Working Group, pp. 1-15, (2004).
Rosen et al., "BGP/MPLS VPNs", pp. 1-26, Network Working Group, Request for Comments: 2547, (1999).

* cited by examiner

*Primary Examiner* — Kevin C Harper
(74) *Attorney, Agent, or Firm* — Finnegan, Henderson, Farabow, Garrett & Dunner, L.L.P.

(57) ABSTRACT

A system for fault and performance recovery in a communication network includes a set of network apparatuses as well as a plurality of sites connected by means of connections having a given topology. The network also includes routers for implementing given routing policies and has associated therewith at least one database maintaining information regarding the network apparatuses. The system includes test modules for executing performance tests created automatically by exploiting the information available on the topology of the connections between the various sites and by accessing the database in question. The test modules are configured for analysing the results of the performance tests to detect possible fault and performance impairment conditions of the network. In the presence of a fault and performance impairment condition detected in the network, the routers modify the routing policy to compensate for the fault and performance impairment condition.

60 Claims, 10 Drawing Sheets

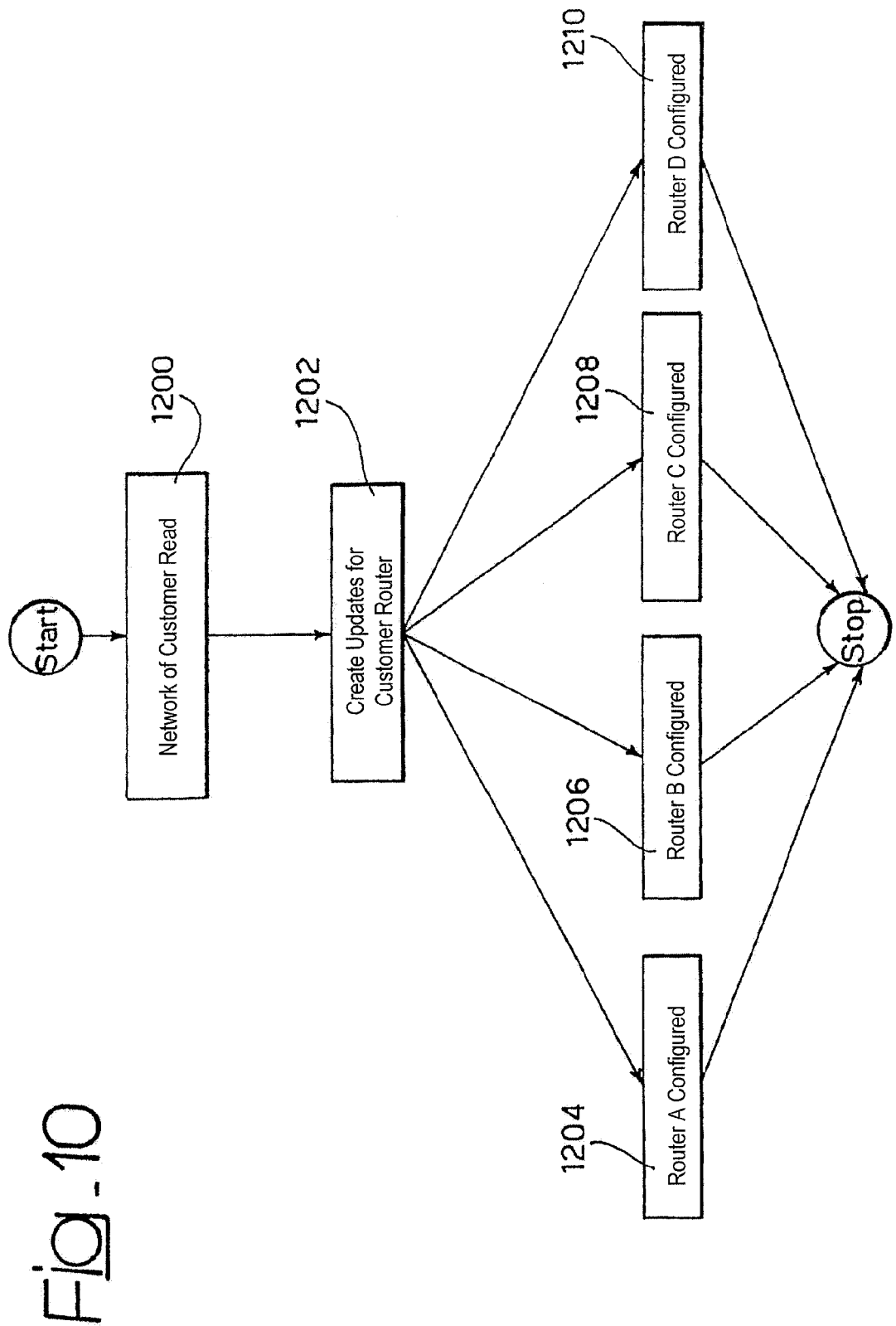
Fig_-10

METHOD AND SYSTEM FOR FAULT AND PERFORMANCE RECOVERY IN COMMUNICATION NETWORKS, RELATED NETWORK AND COMPUTER PROGRAM PRODUCT THEREFOR

CROSS REFERENCE TO RELATED APPLICATION

This application is a national phase application based on PCT/EP2004/08523, filed Jul. 29, 2004, the content of which is incorporated herein by reference.

FIELD OF THE INVENTION

The present invention relates to techniques for fault and performance recovery in communication networks. The invention was devised in view of the preferred application to Virtual Private Network services provided through multiple backbones. However, reference to this preferred field of application is not to be considered as limiting the scope of the invention.

DESCRIPTION OF THE RELATED ART

The significant development and ever increasing diffusion of telematic networks based upon the Internet Protocol (IP) and the increasingly important role that these assume in the context of company realities, more and more frequently leads to the use of these networks as means of communication between the different entities in which an organization is structured. A typical solution in this connection consists in the use of Virtual Private Networks (VPNs), offered by a Service Provider on his own backbone network infrastructure, with characteristics of privacy and security, for connection between the sites of a customer.

In the context of the types of IP Virtual Private Networks offered as service managed by a Service Provider, a model of embodiment of particular interest is the technology known as IP Virtual Private Networks in Multi Protocol Label Switching (MPLS). For this reason, reference will be made, for example, to Border Gateway Protocol/Multi Protocol Label Switching Virtual Private Network (BGP/MPLS VPN) solutions, hereinafter referred to as MPLS-VPN networks. The corresponding architecture is defined in E. Rosen, Y. Rekhter, "BGP/MPLS VPNs", IETF RFC 2547.

All the standards/specifications referred to in the following as ietf- . . . or RFC . . . are publicly available at the date this application is filed with the IETF Website at www.ietf.org.

The elements of the Border Gateway Protocol/Multi Protocol Label Switching Virtual Private Networks architecture, which presents advantageous characteristics from the standpoint of scalability and security, are illustrated in FIG. 1.

The elements shown are essentially a service provider's Network Operating Center (NOC) 10, a Multi Protocol Label Switching/IP backbone (MPLS/IP) 20 and 30, a set of edge routers of the customer (CE, Customer Edge) 100, a set of edge routers of the Service Provider (PE, Provider Edge) 102, a set of core routers of the Service Provider (P, Provider Core) 104, and a set of Route Reflector Servers (RRS) 106. These latter elements, which are optional, have the function of reducing the complexity inherent in the mesh of sessions of the routing protocol Multi Protocol-Border Gateway Protocol (MP-BGP) between the different Provider Edges 102 of the network, as described in RFC2547.

Within the framework of the offer of Virtual Private Networks services there are at times present customer requirements for a high level of guarantee of availability of the service, even during periods of congestion or failures which introduce poor service or degradation of the performance offered by the network. These requirements can be satisfied, for example, by means of a complete duplication of the backbone-network infrastructures on which the Virtual Private Networks service is supplied. Duplication can be either logical or physical.

If, on the one hand, this solution enables a significant increase in the degree of availability and quality of the network service, on the other, it introduces the problem of appropriate management of routing of the customer traffic on the various networks that supply Virtual Private Network connectivity.

The network scenario to which reference is made is thus the one represented, in general terms, in FIG. 1. The customers' sites 50, 52, 54, 56, or 58, are connected through the respective Customer Edge 100 routers to two or more distinct backbones 20 or 30.

A problem arises in detecting any possible failure, or degradation of performance of the backbone by means of which the sites exploit the service, while also handling restoration of the service in very short time intervals. Restoration is obtained by means of control of re-routing of the customer traffic and must be activatable also in the case where the poor service is due to causes internal to the backbone network and not detectable through mere monitoring of the access links.

Mere recourse to re-routing mechanisms obtained by Border Gateway Protocol routing and managed by means of the usual modalities made available by the protocol itself does not provide a complete solution of the problem. These mechanisms do not guarantee detection of all the situations that cause a loss of connectivity or a degradation in the quality of communication between the sites. In fact, the Border Gateway Protocol supplies just an indication of reachability, but does not provide information on the quality of this reachability. For example, it does not typically enable detection of phenomena of malfunctioning that reduce the capacity of transfer of the network, and consequently the performance, below acceptable values.

Furthermore, in the framework of IP Multi Protocol Label Switching Virtual Private Networks, the Multi Protocol-Border Gateway Protocol (MP-BGP) is used within the backbone. Typically, a Service Provider configures the protocol with values of the timers of the same order of magnitude as the default values. In these conditions, a fault would be noted in the network (and hence it would be possible to react) in times of the order of a few minutes.

In addition, there may arise situations in which, within the backbone, one or more routers (typically Provider Edges) have routing tables, for the routing protocol Interior Gateway Protocol (IGP), that are not correct on account of Hardware/Software problems. In these cases, the undesired effect is that those Border Gateway Protocol advertisements relating to networks for which, instead, connectivity no longer exists, continue to be held valid.

Other solutions are known, which aim at optimising routing policies, overcoming some of the aforesaid limitations deriving from the criteria adopted by Border Gateway Protocol routing.

Documents such as WO-A-02/080462, US-A-2002/0078223, WO-A-03/001330, and WO-A-03/041342, basically deal with Routing Control for connection to the Internet. The application of these techniques of Intelligent Routing Control (IRC) in the context of Virtual Private Network IP presents, however, peculiarities and problems that are not present in the case of application for Internet multihoming.

More specifically, WO-A-02/080462 describes a system for carrying out control of routing policies in a network including:

- a number of data collectors, which have the job of determining and probing paths in the network, for the purpose of detecting indications regarding the preferential routings, connected to a central server, entrusted with receiving and handling said data; and
- at least one routing control device, connected, in turn, to the central server, which by querying said server, receives indications on the preferential path towards a given destination network.

The functions can be implemented via stand-alone equipment or in the form of centralized and managed services.

US-A-2002/0078223 describes a system and corresponding methods for evaluating the routing paths on the basis of measurements of performance for the purposes of supporting criteria of intelligence in routing.

WO-A-03/001330 describes a system to be inserted alongside a router connected in a "multihomed" way to a number of Transit Autonomous Systems (TASs), which enable a plurality of Destination Autonomous Systems (DASs) to be reached. The mechanism includes a path-testing process, which performs an analysis of the traffic, by sending packets of tests to a set of IP addresses, towards different Destination Autonomous Systems, which can be selected by an operator via configuration files or other interface (e.g., Graphical User Interface, Command Line Interface). In order to carry out this path-testing process on particular links and Transit Autonomous Systems, the path-testing process enters temporarily (with an appropriate configuration of the router) the test route through which the ping traffic is to be sent.

The data collected by the path-testing process is then supplied to a path-evaluation process, consisting of a decision method which evaluates the quality of the paths for each Transit Autonomous Systems/Destination Autonomous Systems pair. A path for which the level of quality is below a certain (configurable) threshold is a candidate for forcing a re-routing operation. The path-selection process proposes, or, if enabled, carries out, re-routing (change of path) by connecting up to the router and modifying the configuration of the Border Gateway Protocol policy. This operation has the effect of re-evaluating, according to the new policy, all the routes learnt from the Transit Autonomous Systems selected.

WO-A-03/041342 describes a system called Flow-Control System, with functions of control of a multihoming connection to the Internet.

However, these solutions are oriented primarily to handling routing of the traffic to a network such as the Internet, and their application to the context of interest illustrated in FIG. 1 does not appear immediate.

The known solutions for automation of the process of configuration of the measurements, in general, envisage manual configuration of the set of measurements or the possibility of allowing the system to select automatically the destinations to be probed, according to the networks towards which there is a larger amount of traffic. However, neither of these approaches fits conveniently the context in question.

Another important aspect regards control of the paths used by test traffic and user traffic. In this connection, the known solutions refer principally to the context of an Internet multihomed company, i.e., one equipped with a number of connections to said network. In this framework, it is possible to control exclusively the interface, i.e., the link, on which the test traffic is to be transmitted, without knowing from what link the return traffic will come back in. The control function is then generally achieved by temporary insertion of appropriate static routes in the edge router.

Moreover, in the context of a company equipped with multihomed connection to the Internet the possibility exists of acting exclusively on the routing of the traffic directed to the Internet, by forcing, for example, transmission on the backbone of one particular Internet Provider rather than on another, controlling the edge router or routers of the multihomed Internet site. It is not, instead, possible to act on the other end-point of the communication, in so far as the other end-point does not belong to the same administrative domain. In the same way, no possibility exists of acting on the routers internal to the backbones of the Internet Providers.

The above limitations make it impossible to control with sufficient accuracy the traffic entering the site.

In the context of company Virtual Private Networks coming under a number of backbones (such a term being used herein to designate, in general, a number of different physical and/or virtual connections), it is mandatory to pay particular attention to the performance aspects. In this connection, it is essential for the values of the performance parameters (e.g., delays, losses, etc.) of the various backbones that are compared by the analysis and optimisation methods, to be obtained, as far as possible, in the same conditions, i.e., in the same time intervals. It is hence of basic importance to carry out the measurements on the various backbones in parallel.

This aspect is not addressed by the known solutions, which generally envisage making measurements in a cyclic way, examining one backbone/connection at a time.

OBJECT AND SUMMARY OF THE INVENTION

The object of the invention is thus to provide an improved arrangement adapted to satisfy the needs previously described, while dispensing with the intrinsic drawbacks of the prior art arrangements discusses in the foregoing.

According to the present invention, that object is achieved by means of a method having the features set forth in the claims that follow. The invention also relates to a corresponding system, a related network as well as a related computer program product, loadable in the memory of at least one computer and including software code portions for performing the steps of the method of the invention when the product is run on a computer. As used herein, reference to such a computer program product is intended to be equivalent to reference to a computer-readable medium containing instructions for controlling a computer system to coordinate the performance of the method of the invention. Reference to "at least one computer" is evidently intended to highlight the possibility for the present invention to be implemented in a distributed/modular fashion.

A preferred embodiment of the invention is thus a system for fault and performance recovery in a communication network including a set of network apparatuses as well as a plurality of sites connected by means of connections having a given topology. The network also includes routers for implementing given routing policies and has associated at least one database maintaining information regarding the network apparatuses. The system includes test modules (represented by the—suitably configured—apparatuses and/or by specific hardware such as so-called "probes") for executing performance tests created automatically by exploiting the information available on the topology of the connections between the various sites and by accessing the database in question. The test modules are configured for analysing the results of the performance tests to detect possible fault and performance impairment conditions of said network. In the presence of a fault and performance impairment condition detected in the network, the routers are instructed to modify the routing policy in order to compensate for the fault and performance impairment condition.

A particularly preferred embodiment of the arrangement described herein overcomes the limitations of the solution based exclusively on the usual Border Gateway Protocol modalities, by verifying continuously the effective continuity of the service, identifying also any significant degradation in performance and undertaking any appropriate action for the purpose of correcting, in real time, the routing policies.

The strategies used by the arrangement described herein, enable advantage to be drawn from all the possibilities of correlation of the indications detected and of co-ordination of the corresponding corrective action. In a context such as the one in question, these may be exploited in order to obtain a fast and optimal response in the case of failure or degradation of performance, for the customers of the Multi Protocol Label Switching Virtual Private Networks service. The network architecture and the context of service that the arrangement described herein addresses are suited, in fact, to exploiting of certain prerogatives, in favour of rapidity of intervention of the system and of optimisation of the strategies of intervention.

The main preferred features of the arrangement described herein can be grouped together in a number of areas, which regard, respectively:
  creation and configuration of the performance tests necessary for detection of any service deficiencies;
  co-ordinated control of re-routing of the traffic; and
  management of the measurement processes.

BRIEF DESCRIPTION OF THE ANNEXED DRAWINGS

The invention will now be described, by way of example only, with reference to the enclosed figures of drawing, wherein.

Figure 5:
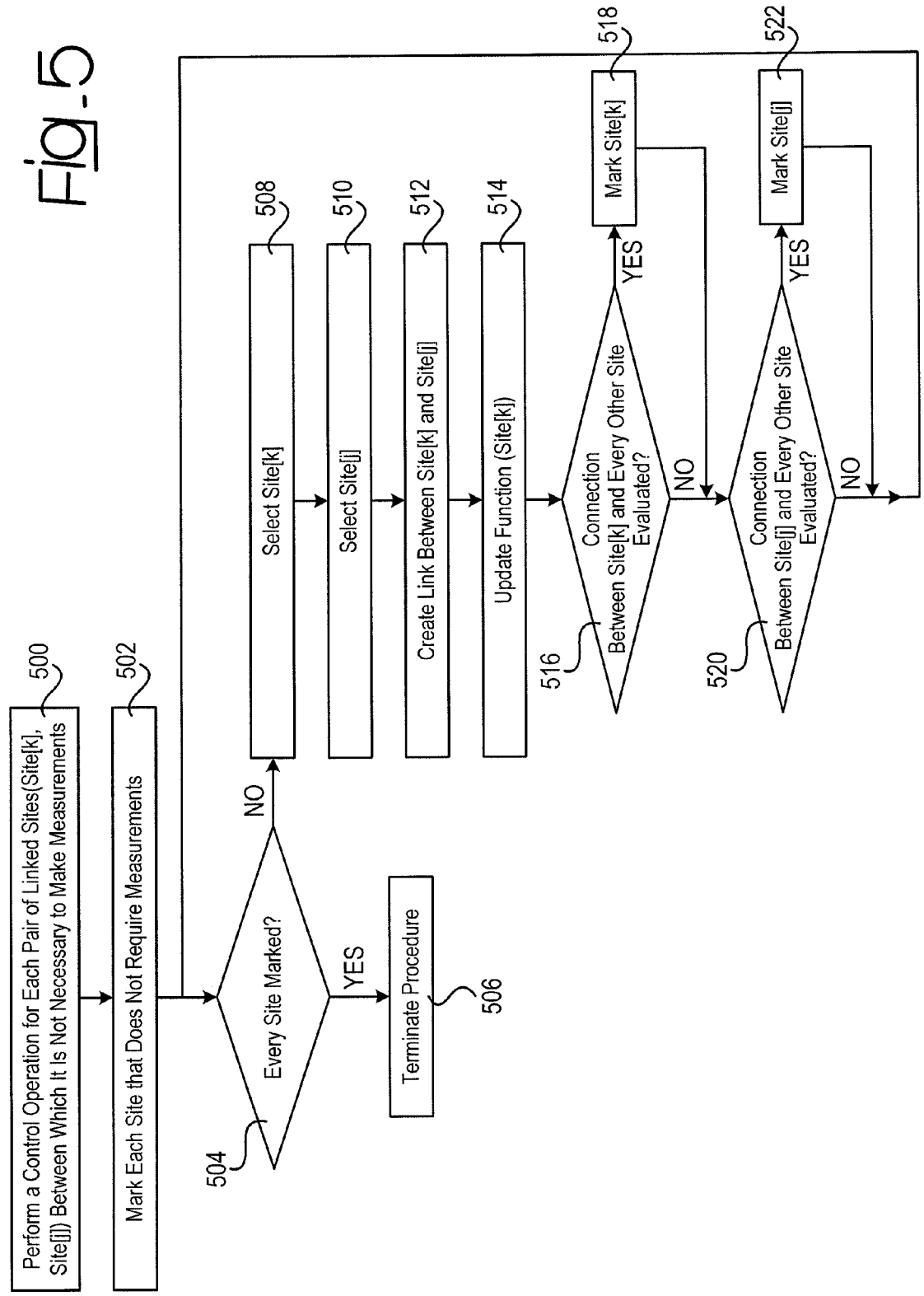
Figure 6:
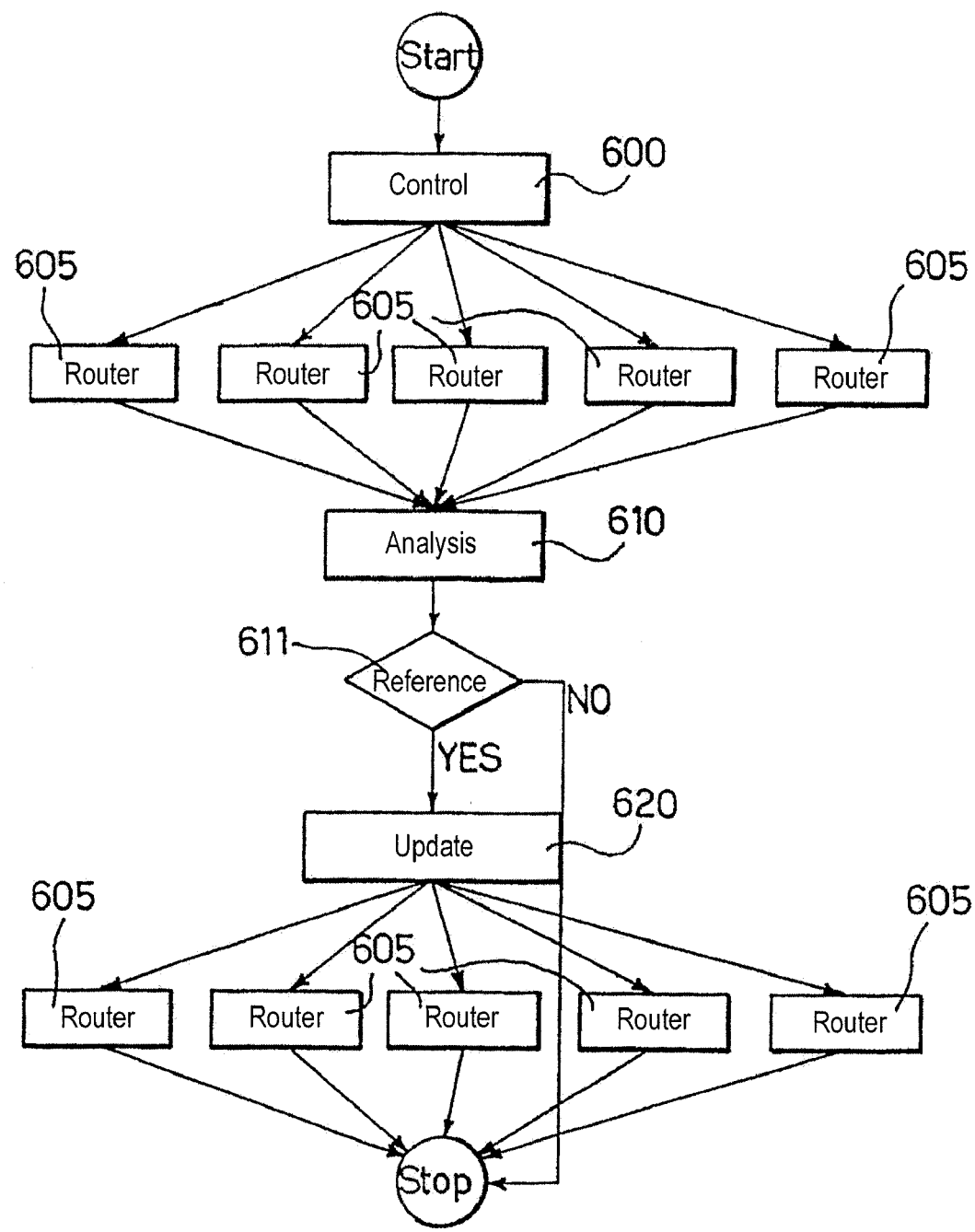
Figure 7:
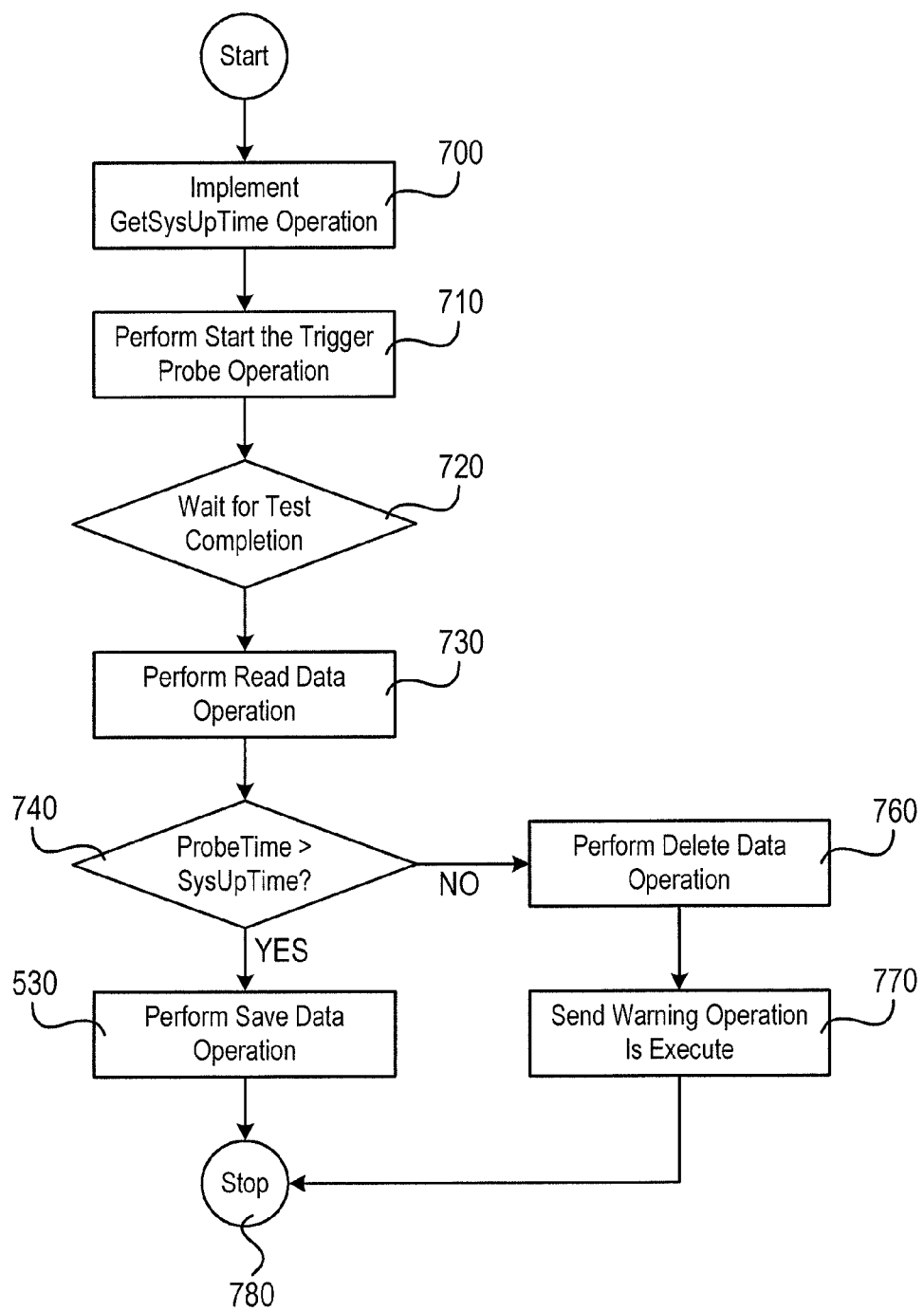
Figure 8:
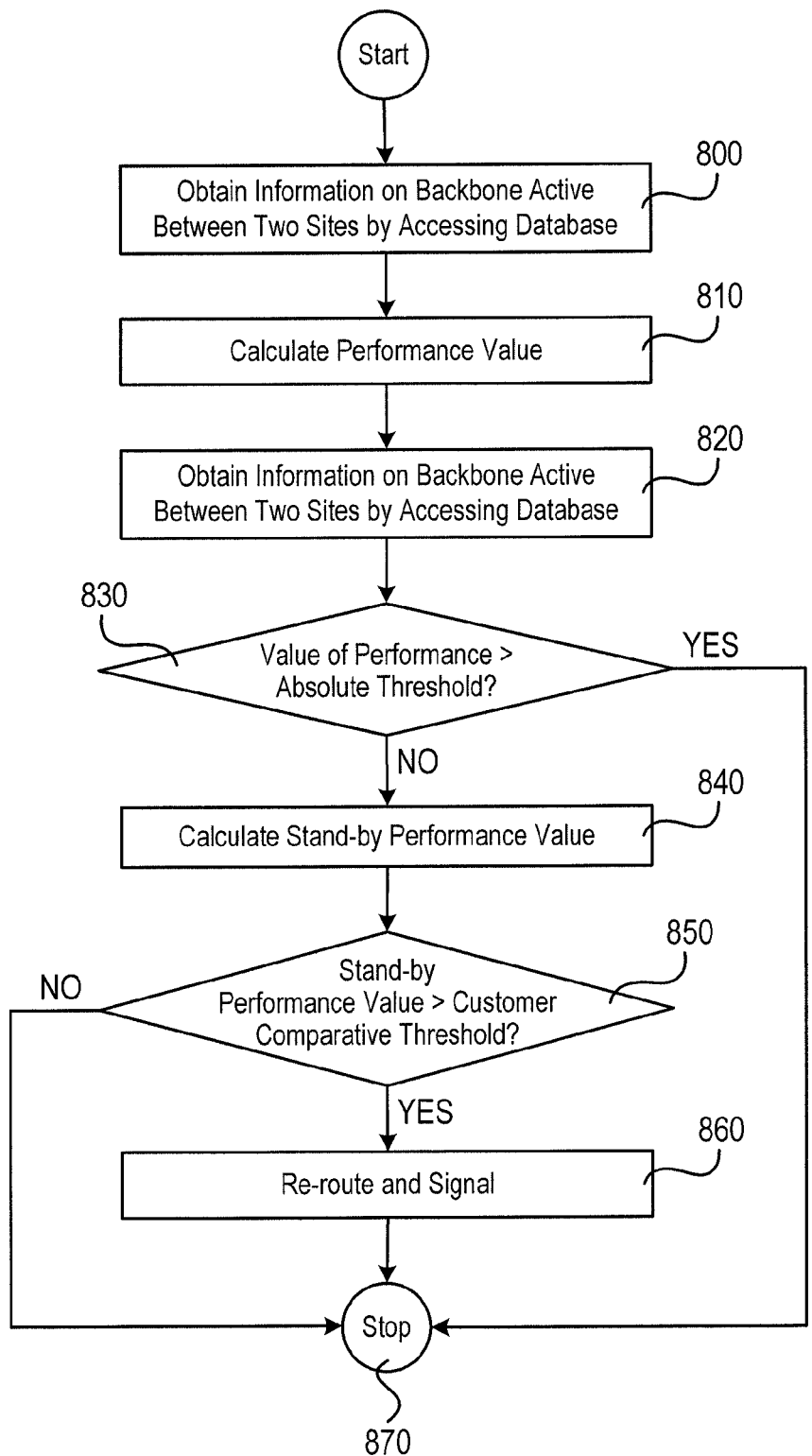
Figure 9:
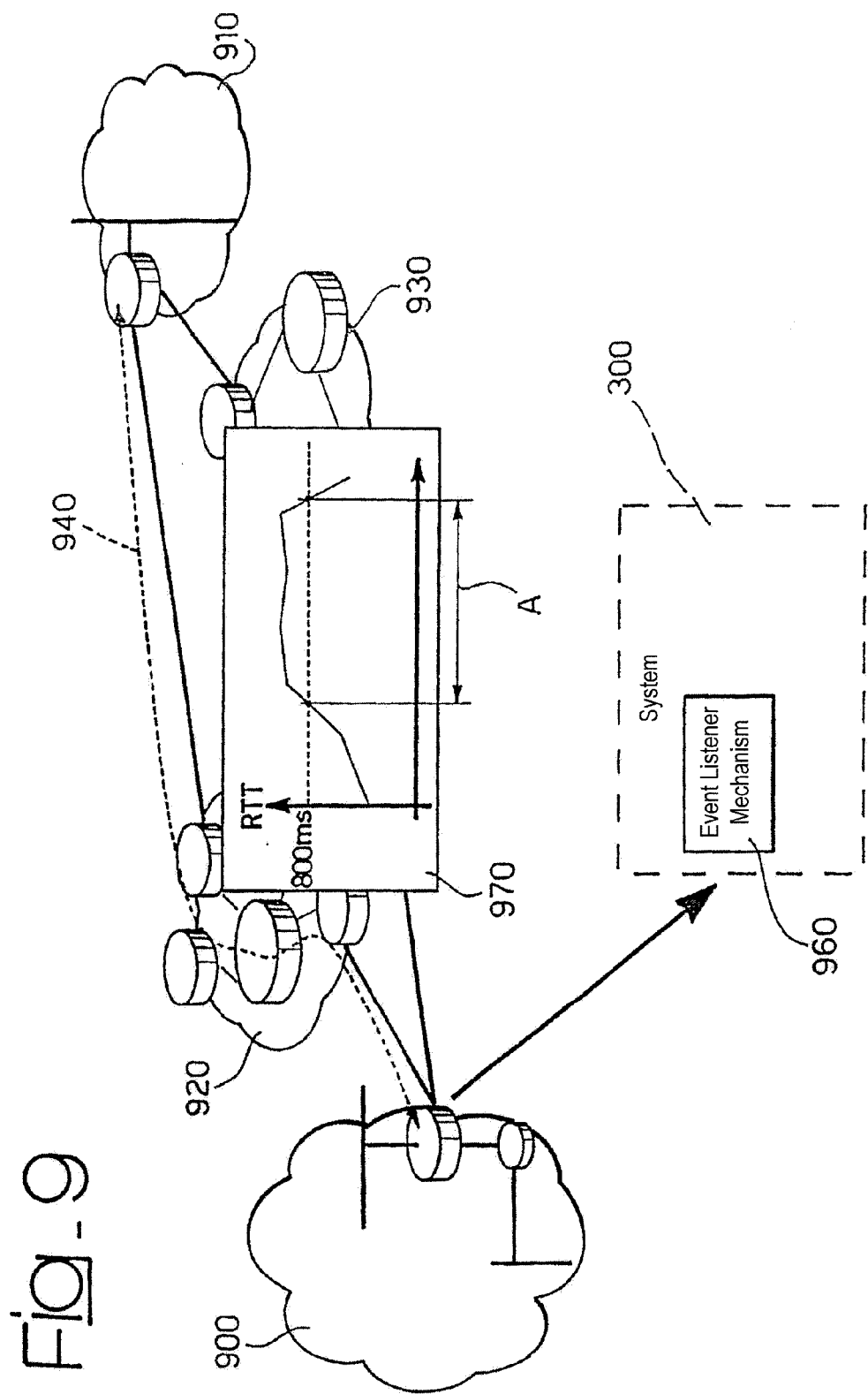

FIG. 5 presents a possible embodiment whereby, on the basis of the topology of the customers configured, the arrangement configures automatically a minimum number of measurements;

FIG. 6 is a flowchart of an operating cycle in the arrangement described herein;

FIG. 7 is a flowchart of a control step in the operating cycle considered in the foregoing;

FIG. 8 is a further flowchart related to an analysis step in the operating cycle considered in the foregoing;

FIG. 9 illustrates an implementation of an asynchronous mechanism of detection of degradation; and FIG. 10 is a flowchart of an updating step in the operating cycle considered in the foregoing.

DETAILED DESCRIPTION OF PREFERRED EMBODIMENTS OF THE INVENTION

A first aspect to be analysed in the arrangement described herein relates to the process of configuration of the measurements between apparatuses present in the various sites of a Virtual Private Network customer. In this connection, bearing in mind that the system is directed typically to a Service Provider, the aim is to prevent having to insert a probe apparatus in each customer site. Instead, by keeping the aspects of analysis and control centralized, the aim is to exploit the functions offered by the apparatuses themselves, such as, for example, the Service Assurance Agent (SAA) commercially available with Cisco and the MIBs (Management Information Bases) developed by the IETF DISMAN working group, i.e. the Ping MIB, the Traceroute MIB, the Script MIB and the Scheduled MIB. Alternatively, the same functions can be provided via specific hardware components in the form of so-called "probes".

Contrary to the manual configuration of the set of measurements envisaged by some prior art solutions, the arrangement described creates automatically and in a coordinated way the appropriate set of performance tests to be executed by the various apparatuses, thus avoiding manual configuration. This function is performed by exploiting the information available on the topology of the connections between the various sites and by accessing the databases of the Service Provider, which maintains the information regarding the network apparatuses (frequently designated as Network Inventory).

Once again in the context of reference, it is not advantageous to condition (i.e. relate) the creation of the tests to the networks with a greater amount of traffic. This aspect is illustrated by the example shown in FIG. 2. This figure shows a first site 200, with networks (i.e., IP networks represented by the corresponding address prefixes) represented by a first and second LAN, 202 and 204, respectively and a second site 210, with a third LAN 212. In such a case, if the measurements are configured on the basis of the criterion of the networks to which the majority of the traffic is directed, it would typically be necessary to configure on a first router 206 tests towards the LAN 212 and on a second router 214 tests towards the LAN 202 and the LAN 204.

However, using this criterion, not only would the potential tests to be conducted increase considerably, but, in the calculation of performance, also segments of network internal to the LAN of the customer sites would be considered, a fact that lies outside the purpose of the arrangement described.

Figure 3:
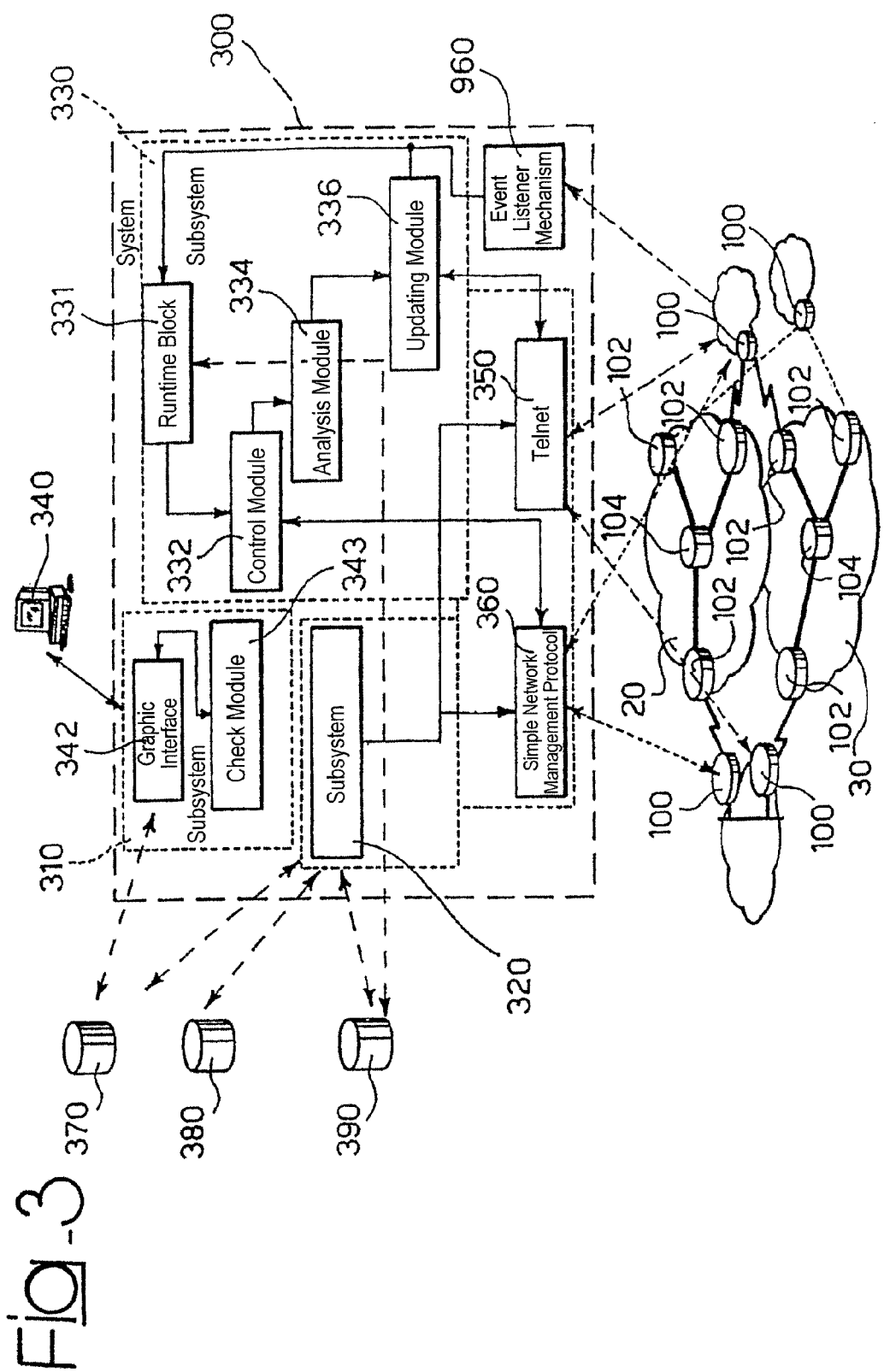
FIG. 3 is a basic block diagram of the arrangement described herein.

The architecture of the proposed arrangement is illustrated in the schematic logic diagram represented in FIG. 3. A centralized system 300 gathers statistics for the purpose of characterizing from the standpoint of performance the reachability and the quality of each connection path between the customer sites (Customer Edges). When detecting a problem on a network, the system 300 can operate immediately by issuing, to the apparatuses, appropriate instructions for choosing, for example, from among the routes received from the other network.

The arrangement examines the performance between sites by carrying out tests between the edge routers and by associating the same performance to all the internal networks of a site. This approach enables a reduction in the number of measurements. This is a fact of no little importance since, given the requirements of performance, the tests must be carried out as much as possible simultaneously on the various backbones, as will be illustrated hereinafter.

In the context of optimisation of the set of measurements, it is expedient to adapt the set of tests to the Virtual Private Network type of the customer. For this reason, the arrangement described is able to activate different sets of measurements, according to whether the Virtual Private Network of the customer has, for example, a "Hub & Spoke" or else "Full Mesh" topology, in order to optimise the testing process.

In the case of a Virtual Private Network of a "Hub & Spoke" type, where all the communications between the multi-backbone sites are directed to or travel from a central site, it, is convenient to limit the test to the stretches between the central site and each generic site i. This option thus envisages configuring on the central site the measurements directed to all the other sites (with possible problems of performance linked to the load of the routers of the central site), or else configuring from the remote sites the measurement directed to the central site.

In the case of "Full Mesh" Virtual Private Networks, instead, it is advantageous to test the end-to-end connections, configuring a complete mesh of measurements. In this latter case, or in situations of Virtual Private Network topologies with incomplete-mesh connections ("Partial Mesh" connections), it is possible to use a method of automatic construction of the measurements that guarantees completeness and, at the same time, optimisation of the test set to be performed. A specific exemplary algorithm for that purpose will be introduced later in connection with FIG. 5.

In the context of control of the routing of the test traffic, i.e., that of Multi Protocol Label Switching Virtual Private Networks, there is the possibility of a complete control of the two directions of communication, via the configuration of the routing policies implemented by both of the sites involved in the communication. There is thus the possibility of making estimations on the connectivity, and on the corresponding performance, referred to a routing path that selectively involves a particular backbone, both out and back (round-trip).

Figure 2:
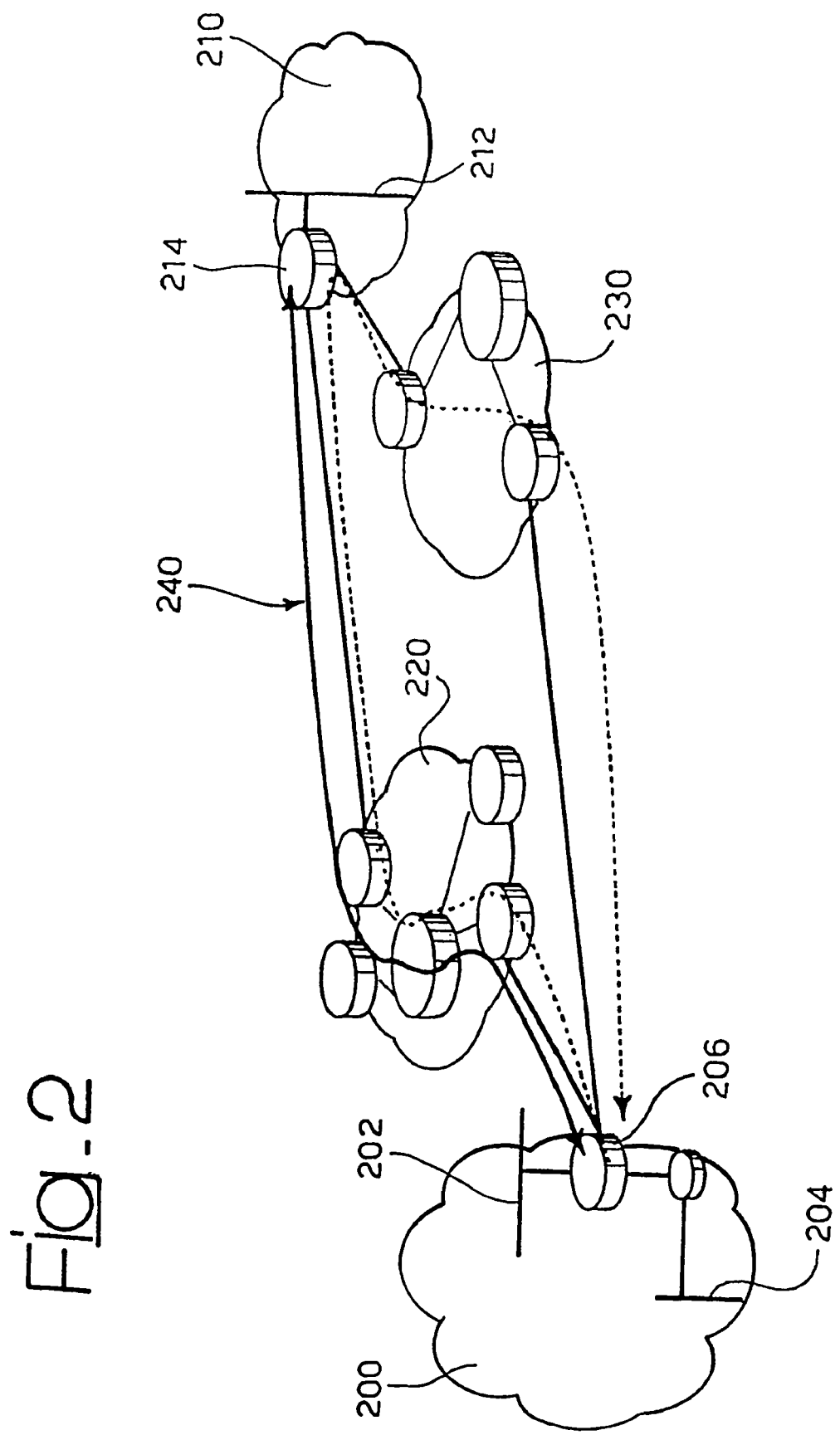
FIG. 2 shows a networks scenario detailing the typical paths used by test traffic.

Referring to FIG. 2, it therefore appears expedient to configure the tests in such a way that the traffic between the site A 200 and the site B 210 always travels on the same backbone 220, in both directions (Path A 240). So the backbone 230 is not utilized for the communications between the sites in question (200, 210). This, in particular, enables an analysis of the behaviour of one backbone at a time, and, since it is consequently possible to report precisely the results of the performance tests, it enables possible corrective actions to be taken in a coordinated and targeted way.

In order to gain control over routing of the test traffic, on each router there are configured (starting from a public address space of the provider, which is assumed as being dedicated to this purpose) two addresses that are advertised respectively on the two backbones. These addresses constitute the targets of the measurements made using the Service Assurance Agent.

Moreover, in the context of company Virtual Private Networks coming under a number of backbones, as addressed by the system in question, the solutions adopted fully exploit the capability of acting on both end points of communication in order to control routing policy. In fact, the sites situated at both ends of a communication path belong to the same administrative domain; this makes it possible to influence both the path of the incoming traffic and the path of the outgoing traffic of the customer sites through control of the routing policies on the edge routers (CEs) located at the two ends of the communication. Furthermore, this possibility is maintained also by performing reconfigurations on the edge routers of the backbone of the Service Provider (PEs).

The arrangement considered sets itself, then, the target (see FIG. 1) of supplying to a given first site, indicated 50, a service capable of guaranteeing an efficient communication with a certain second site 2, indicated 52, namely:
 on the one hand, an efficient transmission of the outgoing traffic, directed towards the destination 52; and
 on the other hand, an efficient reception of the incoming traffic, coming from the site 52.

In order to achieve the above purpose, it is possible to act on the edge router of a given site and influence:
 i) the outgoing traffic, using the Border Gateway Protocol attribute "Local Preference";
 ii) the incoming traffic, using the Border Gateway Protocol attribute "Autonomous System-Path length" (via the so-called pre-pend action, i.e., increasing fictitiously the list of the Autonomous Systems in the Autonomous System-Path for the routes announced to the backbone that are not to be preferred).

In this way, in effect, for the traffic leaving said site, the desired result is obtained. However, for the incoming traffic, the problem is that the action ii) entails the following limitations:
 in general, on the Internet, this action does not guarantee that the traffic will follow the desired path, because the Autonomous Systems traversed could, in turn, alter fictitiously the Border Gateway Protocol attribute "Autonomous System-Path length", or else apply policies based upon the attribute of "Local Preference", (which has priority over the "Autonomous System-Path length" in the Border Gateway Protocol method for path choice);
 in addition, in relation to the specific context of interest for the solution described herein (MPLS VPN offered by the Service Provider via multiple connection to its own backbones) the action ii) affects all of the incoming traffic in the given site and, consequently, it would also have the undesirable effect of re-routing the flows of traffic coming from other sites (other than Site 2) to the given Site 1 (hence, it would not enable optimisation of the relations of traffic in a selective way on the basis of the choices of the decision method).

Figure 1:
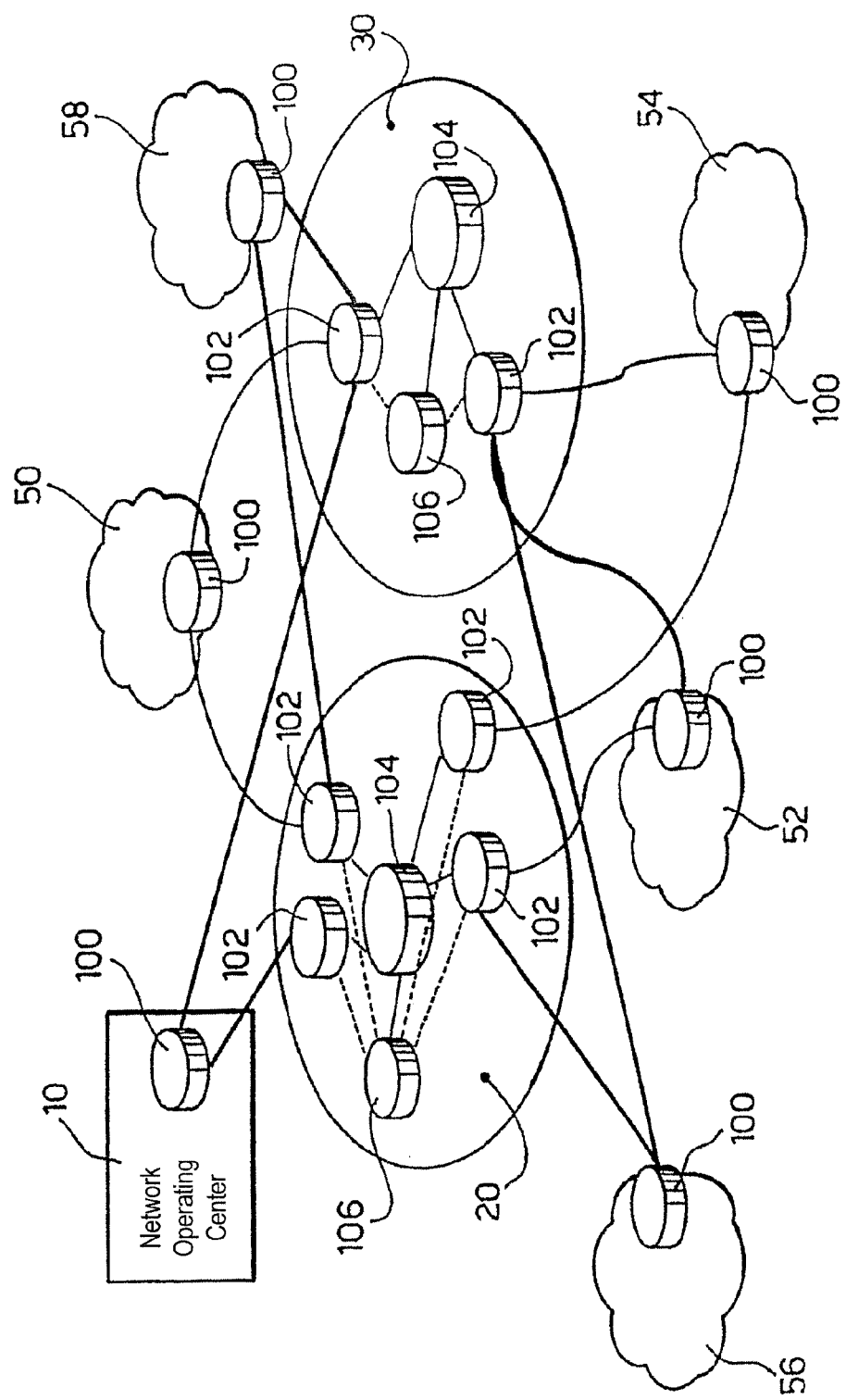
FIG. 1 shows a typical network scenario adapted for use of the arrangement described herein.

Conversely, the preferred embodiment of the arrangement described herein envisages acting exclusively on the traffic leaving the customer site adopting the following method (see FIG. 1).

For the flow from the site 52 to the site 50, instead of acting on the site 50, by controlling the incoming traffic by increasing the "Autonomous System-Path length" by means of the pre-pend technique, the arrangement will act on the traffic leaving the site 52, by configuring the attribute "Local Preference" at a value that is greater for the routes corresponding to the site 50, learned from the preferred backbone.

As an alternative to the technique of acting on the values of the Border Gateway Protocol attribute "Local Preference" corresponding to the various networks of destination of the traffic, on the various connections/backbones, the arrangement described also envisages another technique for exclusive control of the traffic leaving the customer site. In fact, using this second option, it is possible to act on the PE routers, under which the sites come, modifying the Border Gateway Protocol attribute Multi-Exit Discriminator (MED). This second way is useful in a context of CEs unmanaged by the Service Provider.

Finally, thanks to the criteria of co-ordination provided by the arrangement, which is able to correlate the results of the measurements with the Virtual Private Network topology, it is possible to manage re-routing of communications, by modifying the routing policies applied in a site (e.g., the site 50 in FIG. 1) also on the basis of the indications of the measurements made starting from the remote site (e.g., the site 52 in FIG. 1).

The arrangement in question meets the requirement of carrying out the measurements in parallel on the various backbones, on the one hand, with an appropriate configuration of the tests (probes) performed via e.g. Service Assurance Agent. On the other hand, it operates with a corresponding architecture that exploits creation in parallel, wherever advisable, of different processes/threads.

The arrangement described is directed at meeting stringent performance requirements. In the event of marked degradation of performance, limiting intervention to carrying out appropriate measurements periodically may prove insufficient for reacting within the times envisaged. For this reason, the system implements a dual mechanism of detection of degradation of performance: a synchronous-polling mechanism of a periodic type, and a mechanism of asynchronous signalling by the apparatuses. The latter mechanism is obtained by exploiting the possibility of creating asynchronous events (e.g. Simple Network Management Protocol traps) when given thresholds have been exceeded within the configurations of the probes (e.g. Service Assurance Agent).

The architecture of the arrangement described herein and represented schematically in FIG. 3 envisages a centralized controller 300 (coming under the various backbone networks), which gathers statistics on reachability and connection quality between the routers of the various sites of the customer's Virtual Private Network and, when it detects a problem on a network, can operate immediately by instructing the apparatuses involved for choosing from amongst the routes received by a backbone other than the one in use. The centralized controller 300 will reach the apparatuses by exploiting the interface connected to the best backbone at a given moment.

Consequently, the arrangement described herein, on the one hand, carries out functions of analysis and updating, and, on the other hand, drives the control module. In order to obtain the data necessary for the processing operations, the control module will exploit the functions of the apparatuses in the customer site, thus preventing the need to envisage specific hardware.

The system is thus made up of three main sub-systems, which correspond to three main activities:
    a subsystem, 310, responsible for the activity of providing the service and collecting user information
    a subsystem, 320, responsible for the activity of configuring and provisioning network apparatuses
    a subsystem, 330, responsible for the continuous activity.

The subsystem 310 has the purpose of interfacing with the user 340 and making available, through a graphic interface 342 having associated a check module 343, functions for reading the configuration corresponding to a customer/site/router, modifying the service parameters for sites/routers already present in the system, erasing routers/sites/customers, and for the entry of routers/sites/customers. The user information will be entered into a database and, by means of appropriate mechanisms of syntactic and semantic validation, may be used for the step of configuration of the network apparatuses. Some of the databases used in this step are the repositories used by Service Providers for keeping the network inventory.

In the case where the administrator modifies the configuration or else some router needs to be re-configured, the subsystem 320 may have a character of on-demand service of modification of the system-configuration parameters, e.g. customers, devices, topology, performance thresholds, QoS requirements.

In this step, starting from the information contained in the various databases, the system configures, on the network apparatuses, whatever is necessary for activation of the Intelligent Routing Control monitoring/control (for example, loop back interfaces and corresponding addressing operations, route-maps for outgoing and incoming advertisements, measurements, etc.). The subsystem is equipped with a method for optimisation of the set of measurements to be made on the basis of the topology configured by the customers via the subsystem 310.

The subsystem 330 includes a runtime block 331 and implements an operating step that is basically made up of the following three modules:
    a Control Module 332: this carries out operations of monitoring the different connectivity paths between sites and deriving therefrom measurements of at least one of use and performance;
    an Analysis Module 334: this selects the best paths on the basis of the data registered by the preceding module and the policies established by the customer or by the operator; and
    an Updating Module 336: on the basis of what is decided by the Analysis module 334, this imparts the directives of customer-router updating necessary for modifying its routing decisions.

Consequently, with the character of round-the-clock service, the subsystem 330 periodically:
    activates all the measurements configured previously;
    traces the performance data from the routers;
    analyses the measurements according to the methods and the parameters entered during the stage of configuration of the service; and
    re-configures routing, i.e., takes the necessary measures to improve the traffic-routing operations.

In the following a possible implementation is described of the modules previously designated by subsystem 320 and subsystem 330. In fact, these steps concentrate quite interesting elements of the exemplary arrangement described herein.

Reference will be made to the case of Cisco routers, and two backbones will be considered by way of example. The system will act on the Costumer Edges in the customer site. The modalities of dialogue can come about in different ways for the specific requirements. The mechanisms indicated in what follows are Telnet 350 and Simple Network Management Protocol 360. The solution can however be implemented also using routers of other manufacturers (such as Juniper) or other protocols different from Simple Network Management Protocol 360 and Telnet 350 for interfacing therewith (e.g., Common Open Policy Service, COPS or eXtensible Markup Language, XML).

In FIG. 3, references 370, 380, 390 designate three databases collecting information items related to:
    configuration information of the Intelligent Routing Control (IRC) system (clients, times of intervention, sites, routers, topological links, interfaces and IPs used, thresholds, passwords, . . . )—database 370;
    measurements/tests configured by the system on the various apparatuses in order to prompt them whenever necessary—database 380; and
    templates of the SAA instances as used for configuring the various tests (these are essentially templates having default values for various user-configurable parameters such as the duration of the tests, protocol types, packet sizes, . . . )—database 390.

In the sequel of the description, reference will be made to and use will be made of the following Cisco mechanisms used in the embodiment proposed herein for filtering advertisements and for applying policy-routing techniques (similar mechanisms are envisaged also for other technologies).
    Prefix-list: this is a mechanism for definition and configuration of a filter on the basis of IP addresses. In the embodiment described, it is used for filtering the advertisements of the IP networks (also referred to as "routes" and, in what follows, referred to also as IP "networks") to be made through one or more conditions that enable or prevent advertisement of the addresses (or range of addresses) indicated in the condition.

Route-map: this is a mechanism that operates by evaluating in sequence clauses/conditions to be verified (e.g., one or more prefix-list clauses), enabling specific actions to be taken using constructs of the type: if <condition> then <action>. In the embodiment described herein, it is used for deciding exactly which IP networks/routes to announce on the different backbones (block 320) and for making selections on the advertisements received (updating block 336 of subsystem 330).

Figure 4:
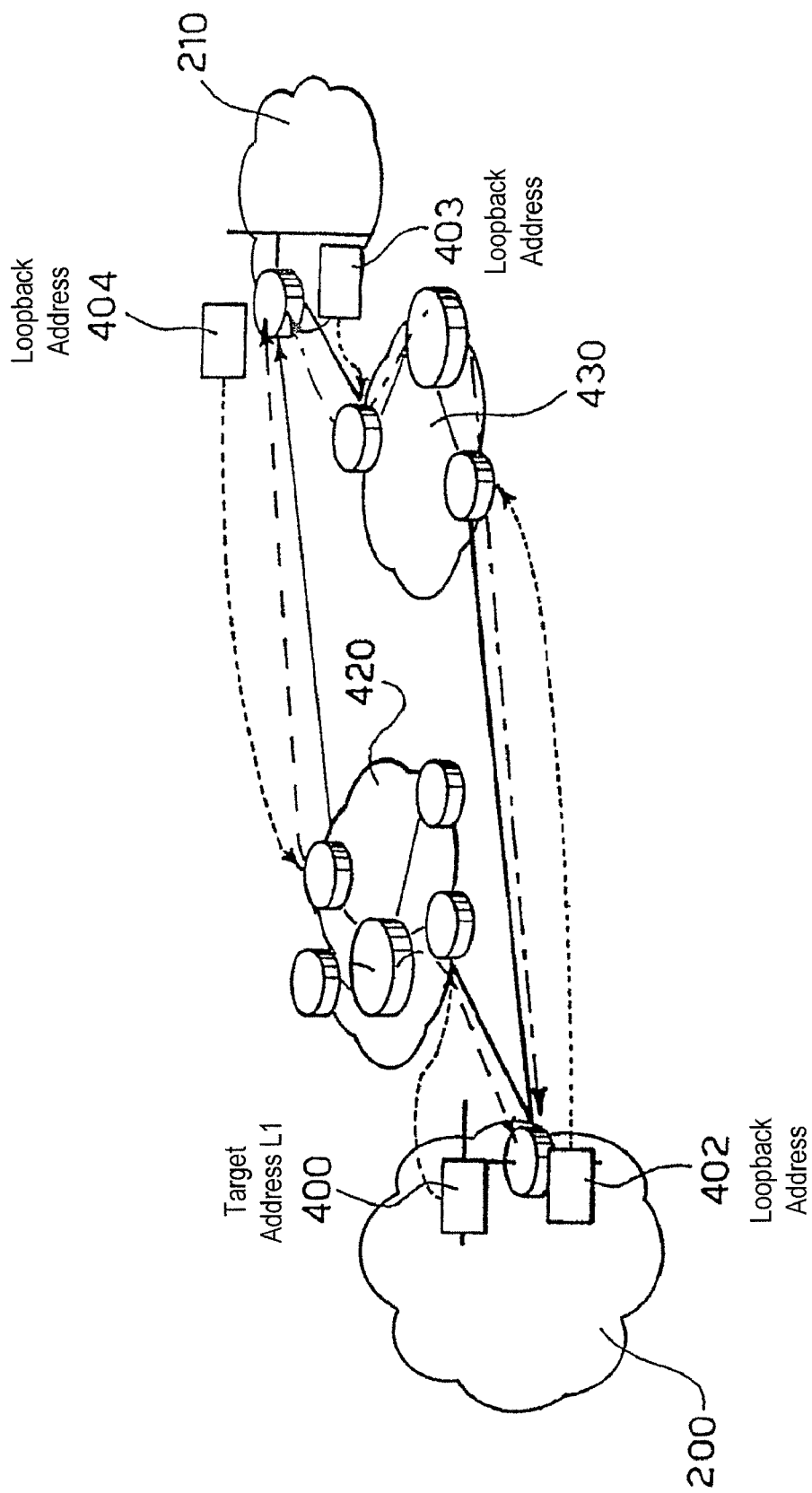
FIG. 4 illustrates pre-configuration of the network elements considered in the foregoing.

As regards the aspects of pre-configuration linked to the measurements, the subsystem 320 described in FIG. 4, in order to carry out its operations correctly, needs to make certain pre-configurations on the customer apparatuses that must be set under control. The contexts involved regard the aspect of the measurements and the aspect of the modalities whereby re-routing operations are to be carried out. In order to make the necessary measurements of quality of the communication, while maintaining the capacity of determining selectively the performance provided through the different backbones, the use is envisaged of separate loopback interfaces on the Customer Edges 100, dedicated to monitoring the path on the respective network backbones 420 and 430. On the generic CE 100 in the customer site, two different loopback addresses 402, 403, 404 must be configured, which will be advertised in the Virtual Private Network, exclusively on the respective backbones to which they are associated, for the purposes of reachability for the measurements. The system will:

- select the two addresses starting from a range of public addresses that the provider will dedicate to this purpose;
- configure on the apparatus in the customer site the two loopback interfaces (with the addresses previously selected), which are to be the targets of the measurements on the two backbones 420 and 430 (for example, the address L1 400 is the target address for the measurements on Backbone 1 420);
- configure appropriate route-maps and prefix-lists for the loopback interfaces referred to above so as to obtain the certainty that a given measurement will traverse the desired backbone (for example, with reference to the network scenario illustrated in FIG. 4, configuring two prefix-lists, one for each loopback address, which will enable passage of all the IP addresses except for the loopback address, and then configuring route-maps, which will prevent advertisement of the addresses of a given loopback address, such as, for example, the address L1 400, on the backbone that is not associated thereto, for example, Backbone 2 430).

Exemplary pseudo-code implementing the procedure just described is reproduced below.

```
interface L1
ip address<ipaddress L1><netmask>
!
interface L2
ip address<ipaddress L2><netmask>
!
router bgp 100
...
redistribute connected
```

```
neighbor<ipaddress Neighbor Backbone 1>remote-as 1
neighbor<ipaddress Neighbor Backbone 1>route-map toBB1 out
neighbor<ipaddress Neighbor Backbone 2>remote-as 2
neighbor<ipaddress Neighbor Backbone 2>route-map toBB2 out
no auto-summary
!
ip prefix-list Loop_BB1 seq5 deny <ipaddress L2>
ip prefix-list Loop_BB1 seq 333 permit 0.0.0.0./0 le 32
!
ip prefix-list Loop_BB2 seq5 deny <ipaddress L1>
ip prefix-list Loop_BB2 seq 333 permit 0.0.0.0./0 le 32
!
route-map toBB2 permit 15
match ip address prefix-list Loop_BB2
match route-type local
!
route-map toBB1 permit 15
match ip address prefix-list Loop_BB1
match route-type local
!
```

As regards the aspects of pre-configuration linked to the re-routing operations, the subsystem 320 corresponding sets the network apparatuses involved so that the variations of configuration of the system decided will have the desired effects in modifying the routings. In general, these modifications are aimed at handling the traffic between two generic sites of a Virtual Private Network, modifying the values of the Border Gateway Protocol parameters of the networks announced by the routers of the different sites.

For the purposes of operation, it is advantageous to provide appropriate route-maps, used for manipulating the metrics regarding the incoming Border Gateway Protocol advertisements for given networks, defined, in turn, via the configuration of appropriate prefix-lists.

The system then, in its normal operation, will populate the prefix-lists, each time entering the IP networks on the basis of the decisions regarding their routing.

Consequently, for the purposes of operation of the system, the two route-maps associated to the respective backbones, are previously configured in such a way that it will be possible to modify, for example, the value of the Border Gateway Protocol attribute "Local Preference" for all and exclusively the networks that will progressively be entered, in the different prefix-lists, during the updating step 336 of subsystem 330. The number of prefix-lists necessary will correspond, then, to the number of different backbones on which re-routing is handled.

As regards the configuration of the performance-test probes, once the operations described above have been completed, the subsystem 310 corresponding, configures, on the customer apparatuses to be handled, appropriate Service Assurance Agent measurements. The Service Assurance Agent, provided by the Internetwork Operating System (IOS) of Cisco routers is formally defined as an application-aware synthetic operation that monitors network performance and can measure, between a Cisco router and any other apparatus (Cisco router, IP Host, etc.), a number of key metrics on the basis of modern Service Level Agreements. Amongst these metrics, there may be recalled response time, availability, jitter, packet loss, and application performance.

The working principle of the Service Assurance Agent can be exemplified as follows:

i. artificial packets are generated by the Service Assurance Agent, which simulate line traffic;

ii. once these packets have arrived at the Target Device, by exploiting the Echo mechanism they are forwarded to the Source Router;

iii. once they have reached the Source Router, the Service Assurance Agent calculates the Round-Trip Time (RTT).

Amongst the measurements made available by the Service Assurance Agent, there is envisaged, in the first place, recourse to the mechanism of "Internet Control Message Protocol Echo", in order to evaluate the size of the possible packet loss in the network and determine the round-trip delay. Should it be deemed expedient to acquire indications on additional quantities, such as jitter, it is possible to use further mechanisms (e.g., Up Down Pair jitter) made available by the Service Assurance Agent. The measurements will typically be made between pairs of customer sites coming under the "dual-backbone" modality, and can be performed via the configuration of the appropriate Service Assurance Agent test probes on the Customer Edge routers present in said sites. The target addresses of the measurements will be the loopback interfaces configured previously. The modalities of configuration and activation of the measurements and the periodicity with which they will be executed must take into account, on one hand, targets fixed for the time of reaction of the system to any possible service deficiency, and, on the other hand constraints in terms of test traffic generated and band occupation.

Since on one and the same apparatus there may be a number of measurements to be triggered, the exemplary embodiment described uses the following technique: it pre-configures a measurement that will be defined as start-trigger; this measurement is to all effects a measurement of an Internet Control Message Protocol Echo type towards a non-reachable address (outside the addressing space). In fact, by exploiting the function present in the Service Assurance Agent of conditioning execution of a measurement to the outcome of another measurement, referred to as start-trigger measurement, the implementation is configured so as to cause the various test probes to start exclusively following upon a time-out occurring on the start-trigger measurement. This approach, on the one hand, guarantees the simultaneous execution of the measurements, and, on the other, it limits of the interactions between the centralized system and the routers for activation of the various measurements (the number of operations is constant for each router irrespective of the number of measurements configured, so enabling a high level of scalability).

The set of test-probe measurements to be configured depends upon the topology of the Virtual Private Network of the customer considered.

The following is a description of a possible embodiment wherein, on the basis of the topology of the customer Virtual Private Networks configured, the system automatically configures a minimum number of measurements. This is sufficient for guaranteeing monitoring of the performance with coverage of all the communication stretches.

Assume that inside the Virtual Private Network there exist N sites connected and consider as being known the topology of the connections between the sites. The aim is to configure just one measurement for each pair of sites connected, evenly distributing (taking also into account the characteristics of the sites) the measurements that each site is to make.

Then, for each apparatus, a value is obtained that indicates (in proportion to the total of all the measurements to be made) how many measurements can be entrusted to this apparatus. This value could be obtained as a function of a number of variables that can be measured statically on the apparatus, such as, for example, a value associated to the type of platform, the hardware equipment (for example, the amount of RAM possessed by the device), and possibly of variables assigned manually on the basis of particular requirements of use of the sites.

An example of such a function could be the following:

$$\text{Function(router)} = \text{platform coefficient(router)} * \text{RAM(router)} * \text{coefficient of use(router)}.$$

As regards the coefficients of use, if, for example, it is intended to balance the measurements in an equal manner for all the routers, the value zero may be assigned to all of said coefficients.

Finding the minimum number of measurements to be configured involves essentially the assignment of the measurements between sites starting from the visit of a graph that stores the topology of the connections between the sites and the policies on the basis of which it is intended to assign the measurements to the sites. A site responsible for the measurements for each pair of sites is assigned. If between two sites the measurements are not to be made, it is sufficient to enter previously fictitious arcs connecting said sites, so that the sites will be already connected, so guaranteeing proper functioning thereof. Setting as N the number of sites and indicating the i-th site as site [i], with i ranging from 1 to N, the flowchart that describes the method appears in FIG. 5.

In FIG. 5, reference numeral 500 indicates an input step that performs a control operation for each pair of linked sites (site [i], site [j]), between which is not necessary to make measurements. In a step 502 every site that does not require a measurements is marked. After that, in a decision step 504, a decision is taken in order to control if every site is marked. If the condition result true, in a step 506, the procedure terminates. Conversely, if a number of sites are not marked the procedure continues in a step 508. Specifically, in the step 508 a site [k] is selected. The site [k] is not marked and his Function(site [k]) is maximum. Furthermore, in a step 510 a site [j] is selected if there is not a link between site [j] and site [k] and the Function(site [j]) is minimum. The site [k] is responsible for the measurements for the pair site [j] and site [k], and in a step 512 a link is created between these two sites. In a step 514 the value of the Function(site [k]) is update to a value equal to Function(site [k])—the value of every single link. In a further decision step 516 the connection between the site [k] and every other sites is evaluated. If the condition is true, the procedure continues with a step 518 where the site [k] is marked. On the other hand, if the condition is false the procedure continues with a decision step 520 where the connection between the site [j] and every other sites is evaluated. If the condition is true the procedure continue with the step 522 where the site [j] is marked. After that, and in the case where the condition is false, the procedure returns to the decision step 504.

In FIG. 5, for each pair of sites there is thus assigned the site responsible for the measurements for that pair. Furthermore, the measurements are assigned to the sites in proportion to the value of the Function(site [i]). In the case where a site (because it is particularly "important" or much used) needs to be kept out of the mechanism of the measurements, it is possible to set the coefficient of use at a value zero and mark the site prior to assignment of the responsibility of the measurements. In this way, it is certain that the site will not make any measurement, but this will not modify the behaviour of the method (the coefficient of use having being set at 0).

A particular case of topology is that of Hub&Spoke Virtual Private Networks: if the customer Virtual Private Networks has a Hub&Spoke topology, the System will configure probes from all the sites towards the hub (or central site). In particular, if there are spoke sites with a router coming under both backbones it will be necessary to:
  i. configure the start-trigger measurement;
  ii. configure a measurement towards the loopback for Backbone 1 (BB1) of the central site;
  iii. configure a measurement towards the loopback for Backbone 2 (BB2) of the central site;
  iv. configure scheduling of the three measurements (i.e., condition the execution of the measurements to points 2 and 3 above at time-out of the start-trigger measurement); and
  v. save the parameters for configuration of the measurements referred to in the previous points (e.g., ID of the measurements) in the database of the system, so as to be able to use them subsequently in normal operation.

In order to handle the case of spoke and hub sites with a number of apparatuses it is possible to envisage appropriate solutions.

FIG. 6 presents a possible implementation at the level of flowchart of the operations of Subsystem 330 in FIG. 3.

For some operations, the various operations are triggered in parallel.

As may be noted, the runtime step may be considered as being split into three steps, highlighted in FIG. 6, with different requirements: whereas an analysis part 610 is handled by a single process (thread) for a given customer, control 600 and updating 620 parts are performed in parallel, by creating one thread for each router 605. In FIG. 6, reference 611 designates an update check that, in the case of a positive outcome, leads from the step 610 to the step 620 and, in the case of a negative outcome, leads directly to the final stop of the process.

During the control step 600, the system triggers on the different routers 605 the measurements configured previously and samples their results, ascertaining that the values recovered refer in effect to the latest measurements. Considering interacting with the apparatus via Simple Network Management Protocol, this can be readily obtained by storing the SysUpTime of the various apparatuses, as shown in FIG. 7.

In FIG. 7 a first step 700 implements a GetSysUpTime operation. In a further step 710 the operation Start the Trigger Probe is performed. In a step 720 the system waits for the test completion. After that in a step 730 Read Data operation is performed. In a decision step 740 the condition ProbeTime>SysUpTime is evaluated. If the condition is true, in a step 750 the Save Data operation is execute and the procedure is finished. Conversely, if the condition is false, in a step 760 the Delete Data operation is performed and in the next step 770 the Send Warning operation is execute.

In the analysis step 610 of FIG. 6 there is only one main process assigned to each customer.

The strategies that can be adopted by the analysis module 610 for making the decisions of reconfiguration of the routing policies of the traffic leaving the site, on the two backbones, can in general be summarized in the main alternatives listed in what follows.

i) According to—customer, for all the sites: this entails processing indicators of performance corresponding to the backbone, as a whole, regardless of the individual site of origin and destination, for example, the weighted average of the data of the measurements on the parameter of interest over the entire set of the "probes"; the indicator, which is one for each backbone, will be used to decide whether to direct all the traffic of the Virtual Private Network sites of the customer onto the alternative backbone.
  ii) according to—customer site: this entails processing of performance indicators corresponding to transit on the backbone of the traffic originated by each customer site, for example, the weighted average of the data of the measurements on the parameter of interest over the set of the "probes" performed on the Customer Edges of the site considered; said indicator, which is one for each site, will be used to decide whether to direct all the traffic of the individual customer site onto the alternative backbone. This mode can be applied, for example, to the case where the communication that it is intended to handle through the Intelligent Routing Control (IRC) system is between the different sites and a central site.
  iii) According to—pair of customer sites: this entails processing performance indicators corresponding to the transit, on the backbone, of the traffic originated by each customer site A towards each of the other destination sites B(i), for example, weighted averages of the data of the measurements on the parameter of interest over the set of the "probes" made on the Customer Edges A to the Customer Edges B(i); said indicators will be used to decide whether to direct the traffic of the communications between A and B(i) onto the alternative backbone. This strategy enables highly selective control of the routings among the various sites and is the one to which reference is made in what follows and to which the pre-configurations given previously refer.

FIG. 8 describes a flowchart with which the operating steps of a possible implementation of the analysis step of the subsystem 330 are summarized. The operations can be summed up as follows:
  in steps 800 and 820, information is obtained on the backbone active between two sites by accessing the database;
  in a step 810 the performance value is calculated with reference to the cost function evaluated on the basis of the parameters entered in the configuration;
  in a step 830 the value of performance corresponding to the active backbone is compared with the absolute threshold contained in the database;
  if the value is below the threshold, no other controls or changes are performed in a step 870, which is in fact a fictitious step;
  if the value is above the threshold,
    in a step 840 a calculation is made of whether and in what percentage the backbone in stand-by would improve the performance; an example of function that may be used for said calculation could be the following:

$$D = \left| \frac{\text{Sample\_BB1} - \text{Sample\_BB2}}{\max(\text{Sample\_BB1}, \text{Sample\_BB2})} \right|$$

in a step 850 the value obtained is compared with the comparative threshold of the given customer present in the database of the system;
    if it is above the threshold, in a step 860 a decision for re-routing is taken and signalled in the updating step.

The embodiment described can be further refined to take also into account the appropriateness of envisaging a mechanism of asynchronous notification, capable of duly signalling any possible significant degradation in performance. This enables prompt reaction to situations such as the ones presented in FIG. 9. The centralized system will then be equipped with an "Event Listener" mechanism 960 (see also FIG. 3). Upon reception of an event (e.g., of the Trap Simple Network Management Protocol or SysLog message type), the mechanism 960 will interrupt the normal flow of operations, triggering an immediate reaction/re-configuration.

Specifically, a diagram indicated 970 in FIG. 9 presents a possible time behaviour over time (abscissa scale) of an observed parameter such as e.g. the Round Trip Time (RTT—ordinate scale). The diagram in question represents an exemplary situation where the parameter RTT—or more precisely, a significant number of samples thereof—exceeds a given threshold (e.g. 800 ms.) over a time interval A during which performance is significantly impaired.

As regards the updating module 336 described, this envisages acting exclusively on the outbound traffic from the customer site. This corresponds to the decision of acting exclusively on the outgoing traffic, because coordinating the configurations at the two end-points of a communication it is possible to manage all the traffic of the different sites. The configuration of the end-points is thus modified in a co-ordinated manner. One possibility is to act on the CE routers 100 to modify the values of the Border Gateway Protocol attribute Local Preference associated to the different connections/backbones, for the various networks for destination of the traffic.

As an alternative, the possibility exists of acting on the PE routers 102, under which the different sites come, and modifying the parameter MED.

With reference to the case where it is necessary to act exclusively on the Customer Edges, the system executes the steps presented in FIG. 10.

In a step 1200 the sites network of the customer AAA is read. In a step 1202 the updates for the customer router are created, and in the steps 1204, 1206, 1208 and 1210 the router A, the router B, the router C, and the router D are respectively configured.

The set of commands are sent in parallel on the different apparatuses through Telnet/CLI connections (or other types of protocol).

The detailed description refers, by way of example only, to the case of the Cisco router and considers two backbones. The mechanisms indicated in the detailed description use, for interaction with the apparatuses, the protocols Telnet and Simple Network Management Protocol.

The arrangement described herein can in any case be implemented also
  using routers of other manufacturers (e.g., Juniper);
  using other protocols different from Simple Network Management Protocol and Telnet for interfacing with the apparatus (e.g., COPS or XML);
  with a number of separate IP backbones that is greater than two.

Again it is recalled that the backbones in question may be either logically or physically distinct.

The system can operate both as a centralized system and as a local arrangement at the customer site.

Consequently, without prejudice to the underlying principles of the invention, the details and the embodiments may vary, also appreciably, with reference to what has been described by way of example only, without departing from the scope of the invention as defined by the annexed claims.

The invention claimed is:

1. A method of fault and performance recovery in a communication network comprising a set of network apparatuses, said network comprising a plurality of sites connected by means of connections having a given topology and adopting a given routing policy, the network having associated therewith at least one database maintaining information regarding said network apparatuses, comprising the steps of:
  executing at least one set of performance tests, wherein said at least one set of performance tests is created automatically by exploiting the information available on the topology of the connections between the various sites and by accessing said at least one database;
  optimizing said set of performance tests by automatically configuring a minimum number of performance tests to guarantee performance monitoring of said network with coverage of all the communication stretches therein by configuring only one measurement for each pair of sites connected in said topology;
  analysing the results of said at least one set of performance tests to detect possible fault and performance impairment conditions of said network;
  modifying said routing policy to compensate for a fault and performance impairment condition in the presence of a fault and performance impairment condition detected in said network; and
  distributing the performance tests to be performed at said sites in said network by generating for each apparatus involved a value representative of the performance tests to be entrusted to said apparatus.

2. The method of claim 1, wherein said at least one set of performance tests comprises performance tests between sites of said plurality, said tests being carried out between edge routers and by associating the same performance to all the internal networks of a site.

3. The method of claim 1, wherein said network comprises at least two backbones, said at least one set of performance tests comprising performance tests carried out simultaneously on said at least two backbones.

4. The method of claim 1, wherein said network comprises at least two backbones and corresponding multibackbone sites and wherein the communications between the multibackbone sites are directed to or travel from a central site, said performance tests being limited to the stretches from a site in said plurality of sites and said central site.

5. The method of claim 1, wherein said network comprises at least two backbones and corresponding multibackbone sites and wherein said network is a full mesh network, said performance tests comprising all end-to-end connections in the network, thus configuring a complete mesh of performance tests.

6. The method of claim 1, wherein said network comprises at least two backbones and corresponding multibackbone sites and wherein said network is a partial mesh network, said performance tests comprising all end-to-end connections in a test subset in the network.

7. The method of claim 1, comprising the steps of:
  generating test traffic in said network;
  controlling the routing of said test traffic in both possible directions of communication by configuring the routing policies implemented by both of the sites involved in the communication, causing said test traffic between a first site and a second site of a given pair always to travel on the same backbone in both directions; and
  making estimations on the connectivity referred to a routing path that selectively involves a given network backbone, both out and back.

8. The method of claim 7, comprising the step of gaining control over said routing of the test traffic by configuring on each router two addresses that are advertised respectively on at least two backbones, whereby said addresses constitute the targets of the performance tests made, when the method is applied to a network comprising at least two backbones.

9. The method of claim 1, comprising the step of modifying the routing policy applied at a site in the network based on performance tests starting from a remote site.

10. The method of claim 1, comprising the step of implementing a mechanism of detection of performance impairment by means of at least one of:
   a synchronous-polling mechanism of a periodic type; and
   a mechanism of asynchronous signalling by said network apparatuses.

11. The method of claim 10, wherein said asynchronous signalling is obtained by creating asynchronous events in the network when given thresholds have been exceeded within predetermined probe configurations.

12. The method of claim 1, comprising the steps of performing in a centralized manner the steps of:
   gathering statistics on reachability and associated quality between the routers of various sites in said plurality; and
   in the presence of a fault and performance impairment condition detected in said network, instructing the apparatuses involved for choosing from among the routes advertised by a backbone other than the one in use, when the method is applied to networks comprising at least two backbones.

13. The method of claim 12, comprising the steps of reaching said apparatuses instructed by exploiting the interface/address connected to the best backbone at a given moment.

14. The method of claim 1, comprising at least one of the steps of:
   providing service and collecting user and topology information by means of a first subsystem;
   configuring and provisioning network apparatuses by means of a second subsystem; and
   ensuring continuous network activity by means of a third subsystem.

15. The method of claim 14, comprising the step of providing via said second subsystem, on-demand modification of configuration parameters by configuring, starting from the information contained in said at least one database, functions for performance monitoring and routing control.

16. The method of claim 15, wherein said functions for performance monitoring and routing control comprises at least one of: loop back interfaces and corresponding addressing operations, route-maps for outgoing and incoming advertisements, and performance tests.

17. The method of claim 16, comprising the step of providing via said third subsystem at least one of the steps of:
   monitoring the different connectivity paths between sites, and deriving therefrom measurements of at least one of use and performance;
   selecting best paths in said network based on at least one of data obtained during said monitoring and pre-established policies; and
   imparting directives for router updating for modifying routing decisions based on selections made during said selecting.

18. The method of claim 14, comprising the step of providing via said third subsystem at least one of the steps of:
   activating all previously configured performance tests;
   tracing performance data from the routers;
   analysing the performance tests according to service configuration; and
   re-configuring routing.

19. The method of claim 1, comprising the step of obtaining said value as a function of at least one of a first set of variables adapted to be measured statically on the apparatus, and a second set of variables assigned based on requirements of use of a respective site.

20. The method of claim 19, wherein said first set of variables comprises variables selected from the group of the type of platform, the hardware equipment, and the memory capabilities of the apparatus.

21. The method of claim 1, comprising the steps of reconfiguring the traffic leaving a site over at least two backbones according to customer, for all the sites associated with a given customer in said network, when the method is applied to a network comprising at least two backbones.

22. The method of claim 21, comprising the step of processing performance indicators corresponding to a backbone as a whole regardless of the individual site of origin and destination.

23. The method of claim 22, wherein said indicators comprise a weighted average of the data of the performance tests on the parameters of interest over a set of probes.

24. The method of claim 1, comprising the steps of reconfiguring the traffic leaving a site over at least two backbones according to customer site, irrespective of any other site possibly associated with the same customer in said network, when the method is applied to a network comprising at least two backbones.

25. The method of claim 24, comprising the step of processing performance indicators corresponding to transit on a backbone of the traffic originated by each customer site.

26. The method of claim 25, wherein said indicators comprise a weighted average of the data of the performance tests on the parameters of interest over a set of probes performed on the customer edges of the site considered.

27. The method of claim 1, comprising the step of reconfiguring the traffic leaving a site over at least two backbones selectively for different pairs sites associated with the same customer in said network, when the method is applied to a network comprising at least two backbones.

28. The method of claim 27, comprising the step of processing performance indicators corresponding to the transit, on a backbone of the traffic originated by each said customer site toward any other destination sites.

29. The method of claim 28, wherein said indicators comprise weighted averages of the data of the performance tests on the parameters of interest over the set of probes made on the customer edges of each said customer site to the customer edges of any other destination sites.

30. A system for fault and performance recovery in a communication network comprising a set of network apparatuses comprising a plurality of sites connected by means of connections having a given topology and comprising routers for implementing given routing policies, the network having associated therewith at least one database maintaining information regarding said network apparatuses, comprising:
   test modules configured to:
      execute at least one set of performance tests, wherein said at least one set of performance tests is created automatically by exploiting the information available on the topology of the connections between the various sites and by accessing said at least one database,
      optimize said set of performance tests by automatically configuring a minimum number of performance tests to guarantee performance monitoring of said network with coverage of all the communication stretches therein by configuring only one measurement for each pair of sites connected in said topology,
      analyse the results of said at least one set of performance tests to detect possible fault and performance impairment conditions of said network, and
      distribute the performance tests to be performed at said sites in said network by generating for each apparatus involved a value representative of the performance tests to be entrusted to said apparatus; and routers configured for modifying, in the presence of a fault and performance impairment condition detected in said network, said routing policy compensating for said fault and performance impairment condition.

31. The system of claim 30, wherein said at least one set of performance tests comprises performance tests between sites of said plurality, said test modules being configured for carrying out said tests between edge routers and by associating the same performance to all the internal networks of a site.

32. The system of claim 30, wherein said network comprises at least two backbones, wherein said test modules are configured for carrying out said at least one set of performance tests as a set comprising performance tests carried out simultaneously on said at least two backbones.

33. The system of claim 30, wherein said network comprises at least two backbones and corresponding multibackbone sites, and wherein the communications between the multibackbone sites are directed to or travel from a central site, said test modules being configured for carrying out performance tests limited to the stretches from a site in said plurality and said central site.

34. The system of claim 30, wherein said network is a full mesh network, said test modules being configured for carrying out performance tests involving all end-to-end connections in the network, thus configuring a complete mesh of performance tests.

35. The system of claim 30, wherein said network is a partial mesh network, said test modules being configured for carrying out performance tests involving all end-to-end connections in a test subset in the network.

36. The system of claim 30, configured for:

generating test traffic in said network;

controlling via said routers, the routing of said test traffic in both possible directions of communication by configuring the routing policies implemented by both of the sites involved in the communication, said test modules being configured for causing said test traffic between a first site and a second site of a given pair always to travel on the same backbone, in both directions; and making estimations on the connectivity referred to a routing path that selectively involves a given network backbone, both out and back.

37. The system of claim 36, wherein said routers are configured for gaining control over said routing of the test traffic, wherein on each router two addresses are configured that are advertised respectively on at least two backbones, whereby said addresses constitute the targets of the performance tests made, when the system is applied to a network comprising at least two backbones.

38. The system of claim 30, wherein said routers are configured for modifying the routing policy applied at a site in the network based on performance tests made starting from a remote site.

39. The system of claim 30, comprising a mechanism of detection of performance impairment by means of at least one of:

a synchronous-polling mechanism of a periodic type; and a mechanism of asynchronous signalling by said network apparatuses.

40. The system of claim 39, wherein said asynchronous signalling is obtained by creating asynchronous events in the network when given thresholds have been exceeded within predetermined probe configurations.

41. The system of claim 30, comprising a centralized module configured for performing the steps of:

gathering statistics on reachability and associated quality between the routers of various sites in said plurality; and in the presence of a fault and performance impairment condition detected in said network, instructing the apparatuses involved for choosing from among the routes advertised by a backbone other than the one in use, when the system is applied to a network comprising at least two backbones.

42. The system of claim 41, wherein said centralized module is configured for reaching said apparatuses instructed by exploiting the interface/address connected to the best backbone at a given moment.

43. The system of claim 30, comprising at least one of:

a first subsystem providing service and collecting user and topology information;

a second subsystem configuring and provisioning network apparatuses; and a third subsystem ensuring continuous network activity.

44. The system of claim 43, wherein said second subsystem is configured for providing on-demand modification of configuration parameters by configuring, starting from the information contained in said at least one database, functions for performance monitoring and routing control.

45. The system of claim 44, wherein said functions for performance monitoring and routing control comprises at least one of: loop back interfaces and corresponding addressing steps, route-maps for outgoing and incoming advertisements, and performance tests.

46. The system of claim 43, wherein said third subsystem is configured for performing at least one of the steps of:

monitoring the different connectivity paths between sites, and deriving therefrom measurements of at least one of use and performance;

selecting best paths in said network based on at least one of data obtained during said monitoring and pre-established policies; and imparting directives for router updating for modifying routing decisions based on selections made during said selecting.

47. The system of claim 46, wherein said third subsystem is configured for performing at least one of the steps of:

activating all previously configured performance tests;

tracing performance data from the routers;

analysing the performance tests according to service configuration; and re-configuring routing.

48. The system of claim 30, wherein said test modules are configured for obtaining said value as a function of at least one of a first set of variables adapted to be measured statically on the apparatus, and a second set of variables assigned based on requirements of use of a respective site.

49. The system of claim 48, wherein said first set of variables comprises variables selected from the group of the type of platform, the hardware equipment, and the memory capabilities of the apparatus.

50. The system of claim 30, wherein said routers are configured for reconfiguring the traffic leaving a site over at least two backbones according to customer, for all the sites associated with a given customer in said network, when the system is applied to a network comprising at least two backbones.

51. The system of claim 50, configured for processing performance indicators corresponding to a backbone as a whole regardless of the individual site of origin and destination.

52. The system of claim 51, wherein said indicators comprise a weighted average of the data of the performance tests on the parameters of interest over a set of probes.

53. The system of claim 30, wherein said routers are configured for reconfiguring the traffic leaving a site over at least two backbones according to customer site, irrespective of any other site possibly associated to the same customer in said network, when the system is applied to a network comprising at least two backbones.

54. The system of claim 53, configured for processing performance indicators corresponding to transit on a backbone of the traffic originated by each customer site.

55. The system of claim 54, wherein said indicators include a weighted average of the data of the performance tests on the parameters of interest over a set of probes performed on the customer edges of the site considered.

56. The system of claim 30, wherein said routers are configured for reconfiguring the traffic leaving a site over at least two backbones selectively for different pairs of sites associated with the same customer in said network, when the system is applied to a network comprising at least two backbones.

57. The system of claim 56, configured for processing performance indicators corresponding to the transit, on a backbone of the traffic originated by each said customer site toward any other destination sites.

58. The system of claim 57, wherein said indicators comprise weighted averages of the data of the performance tests on the parameters of interest over the set of probes made on the customer edges of each said customer site to the customer edges of any other destination sites.

59. A communication network comprising:
a set of network apparatuses;
a plurality of sites connected by means of connections having a given topology and adopting a given routing policy; and
at least one associated database maintaining information regarding said network apparatuses;
the network having associated therewith a system according to claim 30.

60. A non-transitory computer readable medium encoded with a computer program product loadable into the memory of at least one computer, the computer program product comprising software code portions for performing the method of claim 1.

* * * * *